Feb. 27, 1968

F. R. McFARLAND 3,370,682

CLUTCH WITH MODULATING VALVE

Filed Jan. 27, 1966

INVENTOR.
Forest R. McFarland
BY
Robert L. Spencer
ATTORNEY

3,370,682
CLUTCH WITH MODULATING VALVE
Forest R. McFarland, Flint, Mich., assignor to General Motors Corporation, Detroit, Mich., a corporation of Delaware
Filed Jan. 27, 1966, Ser. No. 523,443
7 Claims. (Cl. 192—85)

ABSTRACT OF THE DISCLOSURE

A clutch and controls therefor for providing smooth clutch engagement including a valve disposed in a bore in a rotatable clutch drum and spring biased to a position to admit maximum rate of fluid flow into a clutch servo chamber. The valve bore extends perpendicular to the plane of rotation of the drum and is positioned in the radial inward portion of the drum such that the centrifugal force effect on the valve is minimized. The valve bore provides an unrestricted opening directly to the servo chamber such that pressure in the chamber acts directly upon one end of the valve to move the valve against the spring. This provides improved valve operation by reducing the effect of oil viscosity changes, particularly upon cold start-up conditions of operation. A stop member prevents the valve from moving to a cut-off position such that fluid pressure will be admitted to the servo chamber through the valve irrespective of rise of pressure in the servo chamber. The valve is initially spring biased to admit pressure to the servo chamber at a maximum rate and moves in response to rise of pressure in the servo chamber to reduce the rate at which fluid is admitted to the servo chamber.

---

Figure 1:
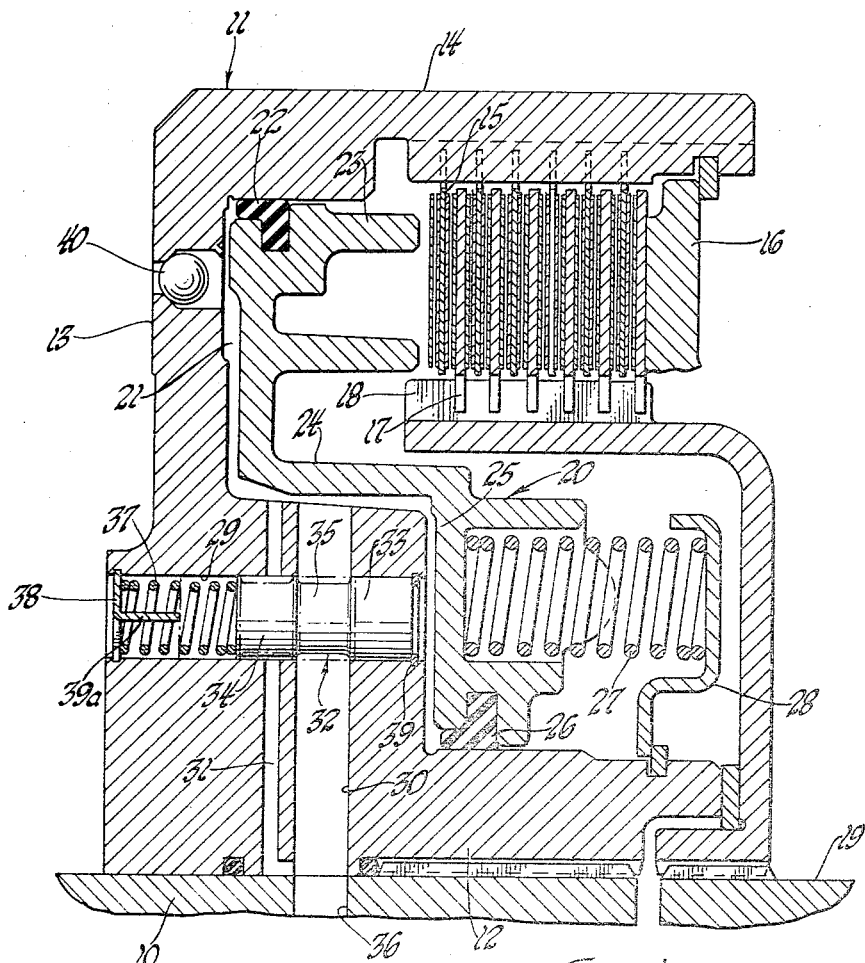

This invention relates to clutches and more particularly to an improved fluid pressure actuated clutch of a type particularly adapted for use in automatic transmissions.

Automatic transmissions commonly employ a clutch which as released for neutral or no drive operation and which is engaged to connect the transmission gearing to a vehicle engine, there being a torque converter disposed between the engine and said clutch. Upon shifting from neutral or no drive to a drive condition of transmission operation, the clutch of conventional design engages with an objectionable jar or shock. The present invention incorporates valve mechanism positioned directly in the engine driven clutch drum for minimizing the shock of clutch engagement which is particularly objectionable when shifting from neutral to a drive condition of operation. By positioning the valve directly within the clutch drum the valve may be made directly responsive to pressure in the clutch chamber for its operation, and senses the actual clutch pressure more accurately than a valve positioned in a pressure passage remote from the clutch chamber. The improved valve positioned directly in the clutch drum eliminates or minimizes the effects of changes of viscosity upon operation of the valve as compared to remotely positioned valves, which is an important feature particularly upon cold starts. The valve is positioned in the clutch drum so as to be directly responsive to clutch actuating pressure within the drum and in such manner as to be unaffected by centrifugal force arising from drum rotation. The valve is spring biased towards a fully open position to permit initial fast flow of pressure fluid into the clutch cavity and is responsive to a predetermined rise of pressure in the clutch cavity to move to a position to permit further restricted flow of pressure fluid into the cavity. The valve will remain in its initial fully open position until initial contact of the clutch members is had and will thereafter, due to the rapid pressure rise within the clutch cavity move to its restricted flow position.

Figure 2:
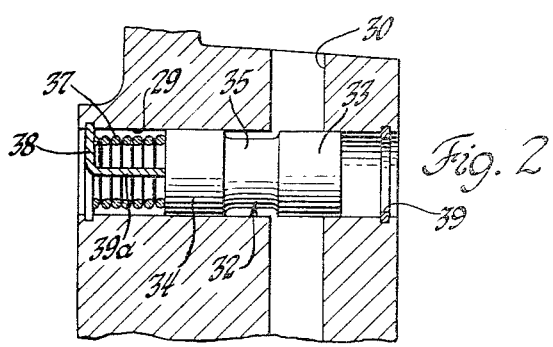

These and other features and advantages of this invention will be apparent from the drawing in which:

FIGURE 1 is a longitudinal partially sectional view of a clutch assembly illustrating the central valve in its fully open position, and FIGURE 2 is a partially sectional view of a modified valve and passage arrangement illustrating the valve in its position of maximum restriction.

Referring to FIGURE 1, an engine driven power input shaft 10, which may be driven directly by an engine (not shown) or an engine driven hydrodynamic torque transmitting mechanism such as a fluid coupling or torque converter drives a clutch drum indicated generally at 11. Drum 11 includes a hub 12 supported upon and driven by shaft 10, an upstanding flange portion 13 and an axially extending drum portion 14. A plurality of drive clutch discs 15 and a clutch backing member 16 are driven by drum 14. Discs 15 are splined to drum portion 14 for axial movement with respect to the drum. Driven clutch discs 17 splined to a driven clutch hub 18 are interleaved with discs 15 and axially movable with respect to driven clutch drum 18. Drum 18 may drive a transmission power input shaft 19.

A stepped piston 20 disposed within drum 11 is shaped to form with drum 11 and hub 12 a chamber 21 adapted to receive fluid under pressure to engage the clutch discs. The outer portion of piston 20 carries a seal 22 and extends axially to provide a pressure plate 23 adapted to engage the clutch discs. An annular flange 24 on piston 20 extends axially beneath driven clutch drum 18 and an upstanding portion 25 supported upon hub 12 and carries a seal 26 to prevent leakage of pressure fluid from chamber 21 along hub 12. A clutch release spring 27 seated upon a spring seat 28 yieldably biases flange 25 to move piston 20 toward its clutch release position.

Hub 12 of clutch drum 11 is drilled axially to provide an axially extending bore 29 and is drilled radially to provide pressure passages 30 and 31. A spool valve 32 having spaced lands 33 and 34 joined by a reduced stem 35 is disposed in bore 29 for axial movement in the bore to control the flow of pressure fluid into chamber 21 through these passages. Drive shaft 10 may be drilled as at 36 to admit pressure fluid to hub 12. A spring 37 seated upon a spring seat 38 biases valve 32 to its illustrated position wherein one end of land 33 contacts a stop member 39 in bore 29. A residual oil dump ball valve 40 carried by flange portion 13 of drum 11 is disposed in the radial outer zone of chamber 21 adjacent pressure plate 23.

In operation with clutch 15–17 released, chamber 21 will be exhausted of fluid under pressure. Assuming the clutch is to be engaged, pressure fluid under control of a suitable valve (not shown) will be admitted to passage 36, passage 30, to chamber 21. Upon movement of piston pressure plate 23 in response to pressure admitted to chamber 21, clutch plates 15, 17 will move towards clutch backing member 16 and upon initial contact with backing member 16 the clutch discs will be in friction contact with each other but will not be completely engaged. Piston pressure plate will thereupon move a few more thousands of an inch toward backing member 16 to complete the clutch engagement. During the initial movement of piston 20 against spring 27 the rise of pressure in chamber 21 is comparatively small and at a relatively low rate.

During the time interval in which the clutch discs are compressed against each other to complete the clutch engagement, a rapid rise of pressure in chamber 21 occurs due to the resistance of the clutch discs when abutting clutch backing member 16 toward further movement toward the clutch engaged position.

Spring 37 is calibrated such that during initial clutch contact pressure may be admitted to chamber 21 through passage 30. Initial pressure rise in chamber 21 acting on the end of land 33 will cause valve 32 to move against spring 37 such that pressure may momentarily be admitted to chamber 21 through both passages 30 and 31. Upon further rise in pressure in chamber 21, as occurs subsequent to initial contact of the clutch discs and during the time interval during which clutch engagement is completed, land 33 progressively blocks off passage 30 as the valve 32 moves against spring 37 while land 34 permits fluid flow to chamber 21 through passage 31. With a sufficient pressure rise in chamber 21, land 33 will block off passage 30 such that pressure is thereafter admitted to chamber 21 solely through passage 31. Thus, as the pressure rises in chamber 21 the flow of fluid to chamber 21 is progressively restricted from an initial condition of full fluid flow to a final condition of reduced flow through passage 31. Spring 37 is calibrated such that during initial movement of piston 20 towards its clutch engagement position the valve 32 will remain in its illustrated right-hand position against stop member 39. Fluid pressure will enter chamber 21 through the relatively large unrestricted passage 30 and the relatively small restricted passage 31 will be blocked off by land 34. As the clutch discs engage, the rapid rise of pressure in chamber 21 acting on the end of land 33 will move valve 32 against spring 37 and open restricted passage 31 while land 33 blocks off passage 30 from chamber 21. Spring seat 38 is provided with an axial extension or stop member 39 which abuts the end of land 34 to limit the range of motion of valve 32 in response to pressure in chamber 21.

Valve 32 is largely unaffected by centrifugal force since it is positioned in the inner radial zone of the clutch drum in the hub of the drum and is positioned to travel in a direction perpendicular to the plane of roation of hub 12 for axial motion alone. Since the valve is positioned with its pressure responsive land 33 directly within chamber 21 it is directly responsive to pressure conditions obtaining in chamber 21. This is a distinct advantage over valves positioned in passages remote from chamber 21 in that the valve operation is not affected by restrictive effects of such passages, is more accurately and quickly sensitive to actual pressure chamber and is unaffected by variations in viscosity of the fluid.

Assuming the clutch is to be released, passage 36 and passage 30 are conneced to exhaust. Initial exhaust of pressure in chamber 21 will be through restricted passage 31. However, only a very slight quantity of oil needs to be discharged to permit clutch release and a very rapid drop of pressure in chamber 21. Spring 37 will thereupon be effective to move valve 32 to block off restricted passage 31 and open chamber 21 to exhaust through passage 30. Ball valve 40, upon drop of pressure in chamber 21, will move off its seat to permit residual fluid trapped in the outer radial zone of chamber 21 to exhaust from the chamber.

The arrangement of valve 32 within clutch hub 12 provides improved performance in that the valve is directly responsive to pressure conditions obtained in chamber 21, and is less affected by oil viscosity changes and passage restrictions than valves remotely positioned from chamber 21. This clutch is designed for use particularly as a neutral clutch for automobile transmissions and has been found to provide smoother clutch engagement when shifting from neutral to a drive condition of operation, particularly on cold morning starts. The valve remains in its wide-open unrestricted position during initial movement of piston 20 towards its clutch engaged position. Upon initial contact of the clutch discs the valve quickly moves to restrict the flow of pressure to chamber 21 since it is disposed with its pressure-responsive land 33 within chamber 21 and directly responsive to pressure variations within the chamber.

While the preferred design is illustrated in FIGURE 1, the design may be modified as shown in FIGURE 2 to eliminate passage 31 of FIGURE 1. In FIGURE 2, the valve 32 is shown in its extreme left-hand position abutting stop member 39A. This is the position assumed by valve 32 when the pressure in chamber 21 is relatively high during the time interval in which the clutch discs are completing engagement after the piston 20 has forced the discs against clutch backing member 16. It will be understood that the parts are the same as in FIGURE 1 except that stop member 39A is extended to prevent valve 32 from completely blocking off passage 30 at high pressure conditions existing in chamber 21. Valve 32 moves responsive to pressure in chamber 21 from a position wherein maximum fluid flow through passage 30 is permitted to a position wherein the flow is restricted. In the FIGURE 2 embodiment the valve is carried by rotating drum 11 and is directly responsive to pressure in chamber 21 in the same manner as that described in connection with FIGURE 1. In both the FIGURE 1 and 2 embodiments the valve is positioned within the rotating drum 11 with one end of the valve directly responsive to pressure in chamber 21. In both embodiments the valve controls the passage means in drum 11 for admitting pressure to chamber 21. In both embodiments the valve bore is perpendicular to the plane of rotation of the drum to minimize centrifugal force effect on the valve. In both embodiments the valve is spring biased to permit maximum fluid flow through the passage means in drum 11 to chamber 21. In both embodiments the valve moves responsive to use of pressure in chamber 21 during the interval of clutch engagement to restrict the rate of fluid flow to chamber 21.

The arrangement of the valve within the rotating drum with one end of the valve directly responsive to pressure in chamber 21 provides a structure which more accurately responds to clutch operating conditions than do structures wherein the valves are positioned in passages remote from the clutch chamber, and results in smoother clutch performance.

I claim:

1. A clutch assembly comprising a rotatable clutch drum, engageable and releasable friction gripping members adapted to be engaged and released, a fluid pressure-responsive member forming with said drum a chamber adapted to receive fluid under pressure, said fluid pressure-responsive member being movable in response to pressure in said chamber to engage said friction gripping members, a bore in said drum, a valve in said bore responsive to pressure in said chamber, a first relatively unrestricted passage for admitting fluid under pressure to said chamber, a second restricted passage adapted to admit pressure to said chamber, means yieldably biasing said valve to block off said restricted passage and to open said unrestricted passage, said valve being movable in response to a predetermined rise of pressure in said chamber to block off said unrestricted passage and to admit pressure to said chamber through said restricted passage.

2. A clutch assembly as set forth in claim 1 wherein said bore in said drum is disposed perpendicular to the plane of rotation of said drum to minimize the effect of centrifugal force due to rotation of said drum on said valve.

3. A clutch assembly as set forth in claim 1 wherein said valve biasing means positions said valve to permit relatively unrestricted flow of pressure fluid into said chamber during movement of said friction engaging elements towards their friction engaging position and wherein said valve is responsive to rise of pressure in said chamber upon contact of said friction gripping element to block off said unrestricted passage and open said restricted passage to admit fluid to said chamber through said restricted passage.

4. A clutch assembly as set forth in claim 2 including a stop member for limiting the range of travel of said valve in said bore in one direction by said yieldable valve biasing means, and a stop member for limiting the range of motion of said valve in the opposite direction in response to rise of pressure in said chamber.

5. A clutch assembly according to claim 3 including a stop member for limiting the range of travel of said valve when said friction gripping mmebers are out of contact with each other and a second stop member for limiting the range of travel of said valve member in the opposite direction when said friction gripping members are disposed in contact with each other.

6. A clutch assembly according to claim 1 wherein said bore is open at one end to said chamber, one end of said valve being responsive to pressure in said bore and chamber to move said valve to block off said unrestricted passage and open said restricted passage upon rise of pressure in said bore and chamber subsequent to initial contact of said friction gripping members with each other.

7. A clutch assembly according to claim 6 wherein said yieldable biasing means is effective to position said valve to block off said restricted passage and open said unrestricted passage whenever said friction gripping elements are released from friction contact with each other.

References Cited

UNITED STATES PATENTS

| 2,472,694 | 6/1949 | Chouings | 192—109 X |
| 2,756,851 | 7/1956 | Collins | 192—109 X |
| 2,853,167 | 9/1958 | Kelley | 192—85 X |
| 2,869,701 | 1/1959 | Yokel | 192—109 X |
| 2,916,122 | 12/1959 | Hindmarch | 192—109 X |
| 3,282,385 | 11/1966 | Snyder | 192—109 X |

BENJAMIN W. WYCHE III, *Primary Examiner.*